United States Patent [19]
Parks et al.

[11] Patent Number: 5,443,562
[45] Date of Patent: Aug. 22, 1995

[54] TREE DELIMBER

[76] Inventors: Jim Parks, 500 Long Branch Rd., Shady Cove, Oreg. 97539; John A. Parks, 2908 Provincial St., Medford, Oreg. 97504

[21] Appl. No.: 309,161

[22] Filed: Sep. 20, 1994

[51] Int. Cl.⁶ .................. B27L 1/00; A01G 23/00
[52] U.S. Cl. ...................... 144/2 Z; 144/343
[58] Field of Search .............. 144/2 Z, 208 R, 343

[56] References Cited

U.S. PATENT DOCUMENTS

| | | |
|---|---|---|
| 3,398,774 | 8/1968 | Hahn . |
| 3,572,410 | 3/1971 | McElderry ............... 144/2 Z |
| 3,672,413 | 6/1972 | Jouppi ..................... 144/2 Z |
| 3,868,981 | 3/1975 | Nadeau .................... 144/2 Z |
| 4,049,032 | 9/1977 | Oldenburg et al. ......... 144/2 Z |
| 4,147,190 | 4/1979 | Nadeau .................... 144/2 Z |
| 4,335,766 | 6/1982 | Davis et al. ............... 144/343 |
| 4,749,012 | 6/1988 | Hamby, Jr. ................ 144/2 Z |
| 4,850,405 | 7/1989 | Johnson et al. ............ 144/2 Z |
| 5,146,960 | 9/1992 | Blakely ................... 144/2 Z |

Primary Examiner—W. Donald Bray
Attorney, Agent, or Firm—Jacobson, Price, Holman & Stern

[57] ABSTRACT

A portable support structure defines a generally horizontal path along which an elongated log may be longitudinally shifted and mounts an upwardly opening tree trunk supporting and guiding crotch structure therefrom as well as a pair of curvilinear limb stripping blades mounted for movement toward and away from each other and defining a tree trunk encircling cutting opening therebetween generally coaxial with the aforementioned path. Log presence sensing structure is spaced along the path from the blades and mounted from the support structure for movement between upper and lower limit positions and resiliently yieldable motion transmitting structure is operatively connected between the log pressure sensing structure and the blades for swinging the latter toward and away from each other responsive to down and up movement, respectively, of the log pressure sensing structure.

11 Claims, 2 Drawing Sheets

TREE DELIMBER

BACKGROUND OF THE INVENTION

1. Field of the Invention

This invention relates to a tree delimber including an upwardly opening crotch-defining support provided with a pair of curvilinear blades mounted therefrom for swinging toward and away from each other and defining a tree encircling opening therebetween through which a tree trunk to have the limbs cut therefrom may be drawn in order to remove the limbs. Structure is provided responsive to the presence of a tree trunk in the crotch for yieldingly biasing the blades together and for reducing the biasing action operative to swing the blades toward each other responsive to the leading end of the tree trunk being elevated relative to the support crotch.

2. Description of Related Art

Various different forms of tree delimbers heretofore have been know. Examples of previously known tree delimbers including some of the general structural and operational features of the instant invention as well as delimbers incorporating structure which is appreciably different from that included in the instant invention are disclosed in U.S. Pat. Nos. 3,398,774, 4,335,766, 4,749,012, 4,850,405 and 5,146,960.

However, these previously known log delimbers do not include the overall combination of structural and operational features of the instant invention which enables a tree delimber to perform its tree delimbing operation independent of any power source other than a grapple-type boom crane utilized to pull a log to be delimbed through the cutting knives of the instant invention.

SUMMARY OF THE INVENTION

The tree delimber incorporates a support structure defining a generally horizontal path along which an elongated tree trunk may be longitudinally guidingly shifted and the support structure further includes front and rear upwardly opening crotch structure or guide means spaced along the aforementioned path for embracingly engaging and supporting the underside of a tree trunk longitudinally shifted along the aforementioned path. The front crotch structure has a pair of curvilinear blades operatively associated therewith and pivotally supported from the support structure for movement toward and away from each other with the blades defining a log encircling opening therebetween when moved toward each other. In addition, a transverse log or tree trunk sensing abutment or pressure bar is mounted from the support structure between the front and rear crotch structures for guided up and down movement and is displaced downwardly toward its lowermost position by a log cradled in the front and rear crotch structures.

Motion transmitting structure is operatively connected between the transverse abutment or pressure bar and the curvilinear blades operative to swing the blades toward and away from each other responsive to down and up movement of the abutment relative to the support structure. The motion transmitting structure includes yieldable means whereby downward movement of the transverse abutment structure or pressure bar toward its lower limit position yieldingly increases a force acting upon the curvilinear blades to swing the latter toward each other.

The main object of this invention is to provide a tree or tree trunk delimber which is portable and may be mounted a wheeled chassis or, preferably, transported to and from a work site upon a flat bed trailer or other similar vehicle and be readily unloaded from as well as loaded upon a flat bed trailer or other similar vehicle through the utilization of a grapple-type crane boom conventionally utilized in logging operations.

Another object of this invention is to provide a tree delimber specifically adapted to be used in conjunction with a grapple-type boom.

Another important object of this invention is to provide a tree delimber which is readily transportable to and from a point of use and which may be effective to delimb a tree trunk without a source of power other than a grapple-type crane utilized to lift, position and pull a tree trunk.

Still another very important object of this invention is to provide a tree delimber including limb stripping or cutting curvilinear jaws swingable between active and inactive positions and with the delimber including structure operative to swing the curvilinear jaws to the active positions thereof responsive to the weight of a tree trunk resting upon the delimber.

A further object of this invention is to provide a tree delimber in accordance with the preceding object and whereby the curvilinear limb cutting or stripping jaws thereof are yieldingly biased toward the active positions.

Another object of this invention is to provide a tree delimber including curvilinear jaws swingable toward and away from each other and with the delimber constructed in a manner such that the jaws are more forcibly yieldingly biased toward each other responsive to a larger diameter tree trunk being delimbed, the greater yieldable force urging the curvilinear blades toward each other being required when stripping larger limbs from a larger tree trunk.

A final object of this invention to be specifically enumerated herein is to provide a tree delimber in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
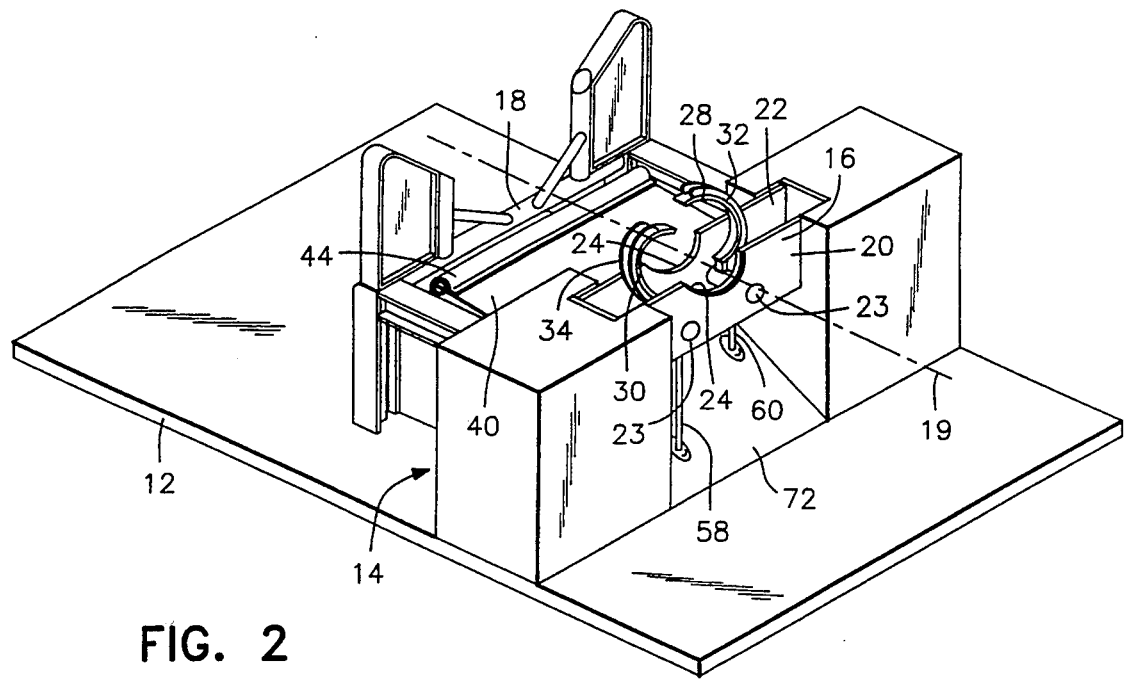
FIG. 1 is a perspective view of a preferred form of tree delimber constructed in accordance with the present invention and with the curvilinear tree limb stripping cutting blades thereof in partially opened positions and the transverse tree trunk sensing abutment in substantially its lower limit position.

Referring now more specifically to the drawings the numeral 10 generally designates the preferred form of tree delimber. The delimber 10 includes a base 12 which may be of any suitable construction adapting the delimber to be carried on any kind of flat bed vehicle so that it may be transported to a use location and lifted from a flat bed vehicle by a grapple crane or the like conventionally utilized in logging operations. Furthermore, such grapple crane also may be used to load the delimber upon a flat bed vehicle or the like after usage. Also, the base 12 may include structure (not shown) for releasable secure anchoring of the base to the ground during usage of the delimber.

Alternatively, the base 12 may actually incorporate a trailer chassis with suitable ground anchoring means such as retractable legs.

A support structure referred to in general by the reference numeral 14 is supported from the base 12 and defines the front and rear upwardly opening tree trunk supporting and guiding crotch structures or guide means 16 and 18 spaced along a predetermined path 19 for movement of a tree trunk to be delimbed relative to the support structure 12. The crotch structure 16 includes a pair of edge upstanding and transverse mounting plates 20 and 22 each provided with an upwardly opening notch 24. The notches 24 are horizontally aligned longitudinally of the center of the base and the crotch structure 18 is horizontally registered with the notches 24.

The notches 24 are generally semicylindrical in configuration and the notch 24 of the plate 20 includes a lower central stationary curvilinear blade 26. Also, a pair of semicylindrical (curvilinear) blades 28 and 30 are provided and mounted upon curved limb stripping levers 32 and 34 pivotally mounted between the plates 20 and 22 as at 23 for angular displacement about parallel axes extending longitudinally of the base 12. The curvilinear blades 28 and 30 are swingable between open limit positions such as those illustrated in phantom lines in FIG. 4 and closed positions such as those indicated in solid lines in FIG. 4 defining a tree encircling opening 36 therebetween substantially concentric with the notches 24 and the crotch structure 18.

Figure 4:
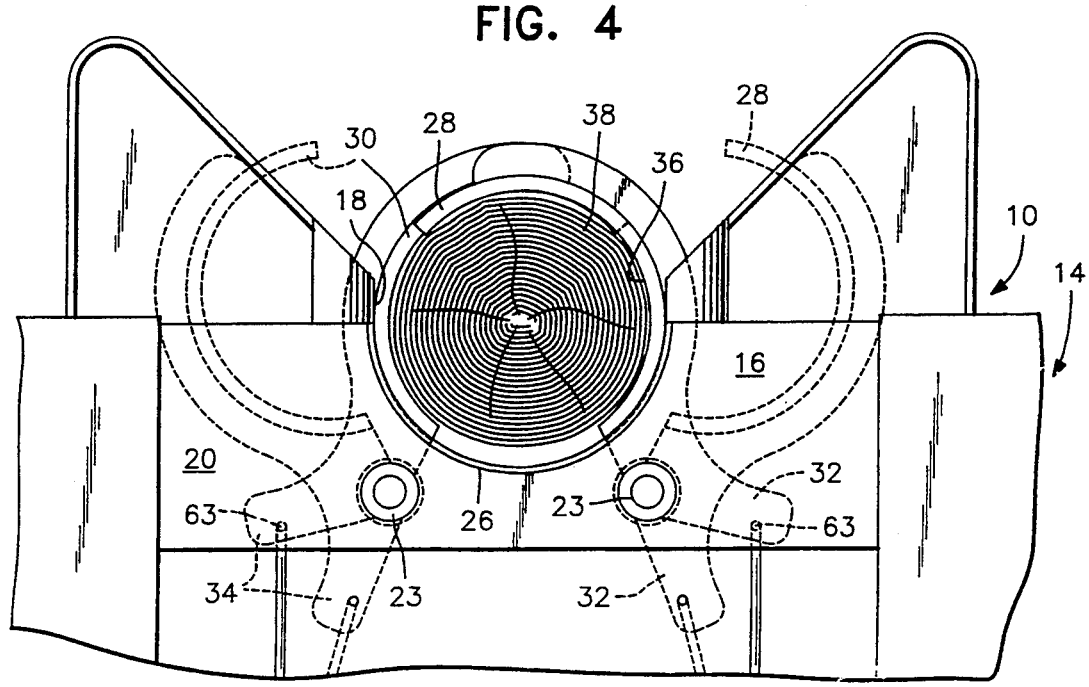
FIG. 4 is a further enlarged, fragmentary, front elevational view of the tree delimber and with the curvilinear cutting blades thereof tightly encircling a tree trunk to be delimbed, open positions of the curvilinear blades being illustrated in phantom lines.

The curvilinear blades 28 and 30 coact with the stationary blade 26 to cut or strip limbs from a tree trunk such as that indicated at 38 in FIG. 4 as the tree trunk 38 is pulled longitudinally between the blades 26, 28 and 30. Of course, inasmuch as the blades 28 and 30 substantially completely encircle the tree trunk receiving opening 36 defined therebetween when the blades 28 and 30 are swung together, the stationary blade 26 may be omitted, if desired.

Figure 3:
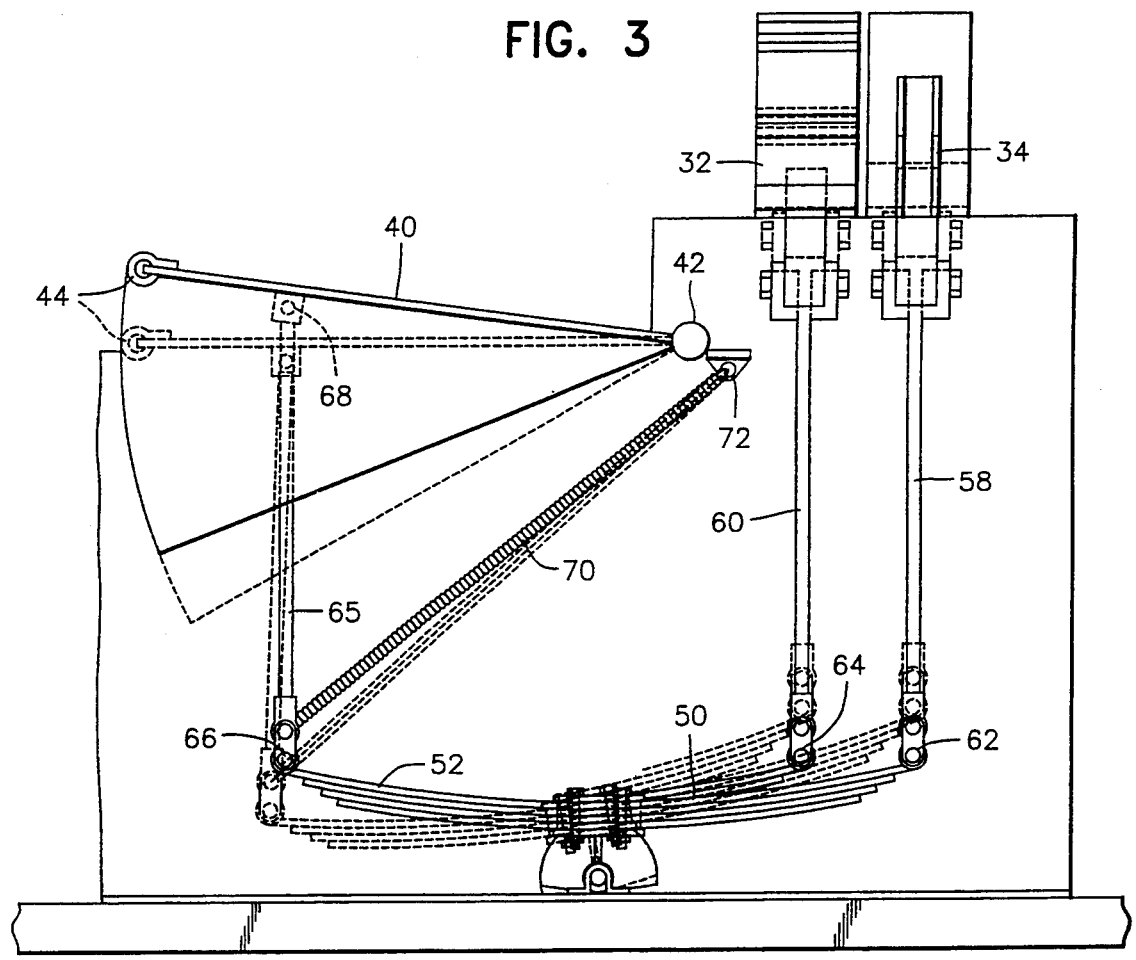
FIG. 3 is an enlarged, fragmentary schematic side elevational view illustrating the manner in which the transverse tree trunk sensing abutment may be downwardly shifted to swing the curvilinear cutting blades toward each other.

With reference now to FIG. 3 of the drawings, a panel 40 extends longitudinally of the support structure 14 between the crotch structures 16 and 18 and its forward marginal edge is pivotally supported from the support structure 14 as at 42 for swinging about a horizontal transverse axis. The free swinging edge of the panel 40 includes a transverse abutment or pressure bar 44 supported therefrom and the abutment or pressure bar 44 is swingable between the uppermost and lowermost limit positions thereof illustrated in solid and phantom line positions, respectively, in FIG. 3. When the abutment bar 44 is in the lower limit position thereof it is horizontally registered with the lowermost portions of the crotch structures 16 and 18. Furthermore, the opposite side longitudinal margins of the plate 40 include depending skirt portions 46 extending therealong to prevent debris from falling past the longitudinal margins of the panel 40 into the interior of the support structure 14.

The interior of the support structure 14 includes a pair of lever assemblies 50 and 52 pivotally mounted from the support structure 14 as at 54 and 56, respectively, for oscillation about aligned transverse axes. The levers 50 and 52 comprise leaf springs and the forward ends thereof have the lower ends of adjustable length actuating rods 58 and 60 pivotally anchored thereto as at 62 and 64. The upper ends of the rods 58 and 60 are pivotally anchored to the levers 34 and 32 as at 63. The rear ends of the levers or leaf springs 50 and 52 have the lower ends of a second pair of actuating rods 65 pivotally anchored thereto as at 66 and the upper ends of the actuating rods 65 are pivotally anchored to opposite sides of the free swinging end of the panel 40 as at 68, expansion springs 70 being anchored between the rear ends of the springs 50 and 52 and opposite side upper portions of the interior of the support structure 14 as at 72.

Figure 2:
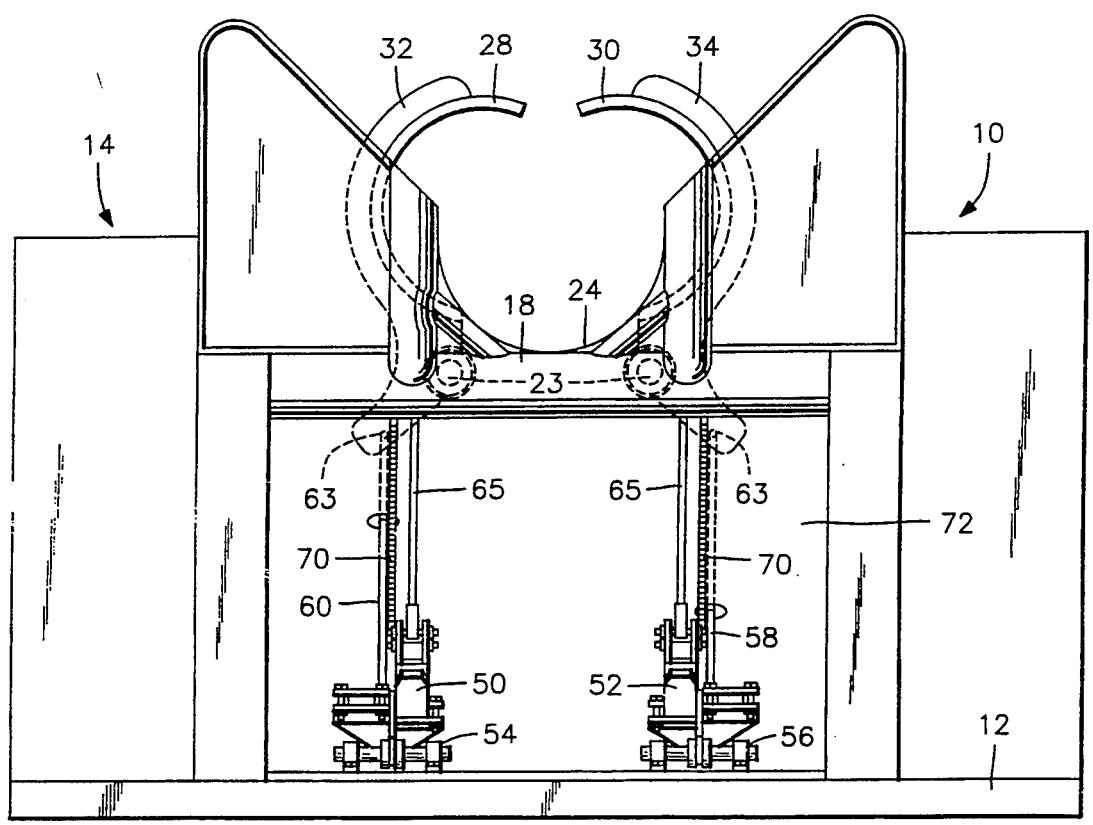
FIG. 2 is an enlarged rear elevational view of the tree delimber as seen from the left side of FIG. 1.

In operation, the springs 72 pull upwardly on the rear ends of the leaf springs 50 and 52 in order to swing the panel 40 to the upper limit position thereof which is disposed above the intermediate solid line position illustrated in FIG. 3, the phantom line position of the panel 40 in FIG. 3 representing the lower limit position thereof. When the rear end of the panel 40 is disposed in its upper limit position and the springs 50 and 52 are in their static, nonflexed positions, the levers 32 and 34 are in the open phantom line positions thereof illustrated in FIG. 4. At this time, a grapple crane may engage the butt end of a tree trunk and position that portion of the tree trunk immediately below the lowermost limbs thereon in the crotch structure 16 with the terminal end of the butt end of the tree trunk 18 spaced rearward of the crotch structure 18. At this point, when the upper portions of the tree trunk 38 are resting upon the ground, the butt end of the tree trunk 38 is in a slightly upwardly inclined position and may partially depress the abutment bar 44 to swing the levers 32 and 34 from the positions thereof illustrated in phantom lines in FIG. 4 to the intermediate positions thereof illustrated in FIG. 2.

Then, the grapple crane is utilized to exert a downward pressure on the butt end of the tree trunk 38 in order to lower the same as well as the abutment bar 44 disposed therebeneath in order to swing the levers 32 and 34 to the operative positions thereof illustrated in solid lines in FIG. 4 defining the tree encircling opening 36 tightly encircling the tree trunk 38. The grapple crane then may be used to pull the butt end of the log or tree trunk 38 past the cutting blades 26, 28 and 30 in order to remove all of the limbs therefrom.

When the abutment bar 44 (disposed closer to the crotch structure 18 than the crotch structure 16) is in the lower limit position thereof illustrated in FIG. 3, the levers 32 and 34 normally would be swung to further overlapped positions than those illustrated in solid lines in FIG. 4, but the springs 50 and 52 comprise yieldable connections in the motion transmitting structure (springs 50 and 52, the rods 58 and 60 and the rods 65) connecting the abutment bar 44 and the levers 32 and 34. Accordingly, when the cutting blades 28 and 30 engage the outer periphery of the tree trunk 38, further downward movement of the abutment bar 44 causes the springs 50 and 52 to be flexed. Therefore, as the diameter of the tree trunk 38 gradually decreases when the tree trunk 38 is pulled past the blades 26, 28 and 30, the cutting blades 28 and 30 continue to swing inwardly so as to maintain contact with the outer surfaces of the tree trunk 38.

If a larger than usual tree trunk is presented to the delimber 10 (such as the tree trunk 38), the cutting blades 28 and 30 may excessively grip the tree trunk 38 therebetween. However, if this occurrence is encountered, the operator of the grapple crane merely lifts upwardly slightly on the butt end of the tree trunk in order that the abutment bar 44 may swing upwardly from its lowermost limit position and the flexure of the springs 50 and 52 may be reduced. In this manner, the amount of force acting upon the cutting blades 28 and 30 to swing the latter toward each other may be reduced when a larger tree trunk is being delimbed.

Of course, the levers 32 and 34 as well as the cutting blades 28 and 30 thereof may be readily replaced or sharpened when necessary. Also, the blade 26 may be sharpened when necessary. Further, the front of the support structure 14 includes an inclined baffle 72 upwardly through which the rods 58 and 60 pass and which forms a shield against the entrance of bark and limb chips into the interior of the support structure 14.

In view of the foregoing it may be seen that a highly versatile tree trunk delimber is provided which does not require any power source to effect operation thereof. The only requirements for operation of the delimber 10 is the weight of the tree trunk to be delimbed pressing downwardly on the abutment bar 44 and the force necessary and applied to the tree trunk by the attendant grapple crane in order to pull the tree trunk longitudinally between the cutting blades 26, 28 and 30.

The foregoing is considered as illustrative only of the principles of the invention. Further, since numerous modifications and changes readily will occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A tree delimber including support structure defining a generally horizontal path along which an elongated log may be longitudinally guidingly shifted, said support structure including front and rear guide means at first and second locations spaced along said path operative to oppose and retain opposite longitudinal side portions of a log being moved longitudinally along said path against shifting laterally of said path and to guidingly support said log from beneath against downward shifting relative to said path, said front guide means including a pair of curved limb stripping levers operatively associated therewith and pivotally supported from said support structure for movement toward and away from each other laterally of said path, said levers including curvilinear blades mounted thereon and defining a tree encircling opening therebetween generally coaxial with said path, said support structure including horizontal transverse pressure bar means supported therefrom, to the rear of said front guide means, for guided up and down movement relative to said support structure and path, and motion transmitting structure operatively connected between said pressure bar means and said levers for moving said levers toward and away from each other responsive to down and up movement, respectively, of said pressure bar means relative to said path.

2. The delimber of claim 1 wherein said pressure bar means is disposed intermediate said front and rear guide means.

3. The delimber of claim 2 wherein said pressure bar means is disposed closer to said rear guide means than said front guide means.

4. The delimber of claim 1 wherein said motion transmitting structure includes lost motion connection means and yieldable means yieldingly biasing said levers to predetermined positions thereof corresponding to predetermined positions of said pressure bar means.

5. The delimber of claim 4 wherein said motion transmitting structure defines a path of mechanical force transmission between said pressure bar means and said levers and said yieldable means includes resilient lever means connected in said path.

6. A tree delimber including support structure defining generally horizontally spaced apart and upwardly opening front and rear crotch structures spaced along a generally horizontal path along which a log to be delimbed may be longitudinally shifted while supported from beneath and laterally guided by said crotch structures, limb stripping levers operatively associated with said front crotch structure and mounted from said support structure for movement relative thereto toward and away from each other laterally of said path, said levers including curvilinear blades mounted thereon and defining a tree encircling opening therebetween generally coaxial with said path, log presence abutment means rearward of said front crotch structure and mounted from said support structure for guided up and down movement relative to said path, and motion transmitting structure operatively connected between said abutment means and said levers for moving said levers toward and away from each other responsive to down and up movement, respectively, of said pressure bar means relative to said path.

7. The tree delimber of claim 6 wherein said abutment means is disposed intermediate said front and rear crotch structures.

8. The tree delimber of claim 7 wherein said abutment means is disposed closer to said rear crotch structure than said front crotch structure.

9. The tree delimber of claim 6 wherein said front crotch structure includes lower stationary blade means.

10. A tree delimber including support structure defining a generally horizontal path along which an elongated log may be longitudinally shifted, said support structure including upwardly opening tree trunk supporting and guide crotch structure generally concentric with said path, curvilinear limb stripping knives cooperatively associated with said crotch structure and mounted from said support structure for movement toward and away from each other and defining a tree encircling cutting opening therebetween generally coaxial with said path, log presence sensing means spaced along said path from said crotch structure and mounted from said support structure for movement relative thereto between upper and lower limit positions relative to said path and downwardly displaceable toward said lower limit position responsive to a log disposed along said path, and resiliently yieldable motion transmitting means operatively connected between said log pressure sensing means and said knives for swinging the latter toward and away from each other responsive to down and up movement, respectively, of said log presence sensing means relative to said support structure.

11. The tree delimber of claim 10 wherein said motion transmitting means includes pivoted resilient lever means.

* * * * *